Jan. 6, 1948.  C. A. GAPEN ET AL  2,434,207
ANTISKID RUBBER TIRE
Filed Jan. 14, 1947
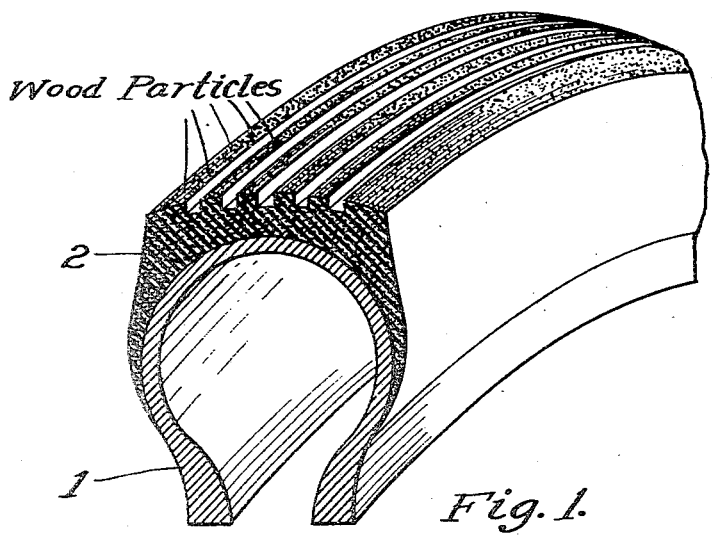
Inventors
Clarence A. Gapen
Lonnie Gapen
By Christy, Parmelee & Strickland
Attorneys Patented Jan. 6, 1948

2,434,207

UNITED STATES PATENT OFFICE 2,434,207

ANTISKID RUBBER TIRE

Clarence A. Gapen and Lonnie Gapen,
Morgantown, W. Va.

Application January 14, 1947, Serial No. 722,072

2 Claims. (Cl. 152—211)

This invention relates to vehicle tires and method of making same, and the present application constitutes a continuation-in-part of our abandoned application Serial No. 487,754, filed May 20, 1943.

It has heretofore been proposed to incorporate into rubber used in vehicle tires certain coarse particles designed to improve the traction qualities, but such attempts have not met with commercial success due to a number of factors, among which are the abnormally high rate of wear which results in some cases and in others from the fact that in freezing weather or in icy conditions glazing of the tread from ice is apt to result, making the tire considerably less satisfactory and more dangerous than a conventional tire.

Referring more particularly to the drawing, numeral 1 denotes an ordinary vehicle tire carcass upon the exterior surface of which is molded a covering body or tread 2 of natural or synthetic rubber or compound thereof having interspersed therein fibrous or ligneous particles in the form of wood chunks in accordance with the teachings of the present invention. Any well known form of tread design may be used such as the circumferentially grooved design illustrated.

An object of this invention is to provide a vehicle tire or other anti-skid rubber tread surface which is devoid of the above mentioned disadvantages and which has remarkably high anti-skid characteristics as well as unusually long life.

Other objects and advantages will become apparent from a study of the following specification taken with the accompanying drawing wherein:

The single figure is a fragmentary perspective view, partly in cross section, of a vehicle tire having a rubber tread embodying wood particles in accordance with the present invention.

We have found that amazing traction qualities can be secured by compounding the rubber with irregularly-shaped wood particles of a predetermined size and in an adequate amount. We may use in the neighborhood of 25% by weight of such wood particles, although the exact percentage is not critical, as it may range from somewhere around 30% by weight to somewhere around 20% by weight. Since the density of the crude rubber is very much greater than the density of the wood particles, this is equal to about one part of rubber by volume to four parts of wood particles. If the weight of wood particles is reduced too far below the optimum of about 25%, the maximum anti-skid qualities are not secured, and the density of wood particles on any exposed area of surface is not sufficiently great to give the best traction results, whereas if the wood particles are increased much above the optimum of 25% the life of the rubber is impaired and it does not have the resilience or toughness to give good wearing qualities. We have found, contrary to expectations, that the use of 25% by weight of wood particles, or one part by volume of rubber to about four parts by volume of wood particles does not detrimentally impair the resilience, toughness or wearing qualities of the rubber, whereas the traction effect is increased to an amazing extent. Exhaustive demonstrations have proven that tires so prepared give traction where no other materials used on the vehicle tires will possibly hold. Cars provided with tires made with rubber compounded according to the present invention are enabled to ascend and descend heavy snow and ice-covered grades with much greater facility than cars equipped with conventional tires having chains, and in fact cars equipped with tires compounded in accordance with our invention have in comparative tests climbed grades where cars equipped with conventional chains could not secure traction.

The character of the wood particles are important; they must be irregular chunks of wood. All of them should be of a size which will pass through a #6 mesh screen, and all or substantially all should be retained and not pass through a #16 mesh screen. Larger than #6 mesh, the particles are easily broken out of the tire and reduce the wearing qualities, whereas sizes smaller than #16 mesh merely act as an inert filler much the same as wood flour would do, impairing the strength of the rubber and adding nothing to its traction-resisting qualities. Normally we take particles produced by a #10 wood cutting saw removing about 20% by weight, so that substantially all of the particles retained are smaller than a #6 mesh, i. e., will not be retained on a #6 mesh, and are larger than a #16 mesh, that is, they will be retained on a #16 mesh. It is of course probable that notwithstanding careful screening some fines will be retained, but the mass is predominantly within this range of sizes and not all of the particles are of uniform size, varying between a #6 and a #16 mesh. Particles of both hard and soft woods have been used and no appreciable difference in results have so far been measured.

Particles formed by a coarse saw, such as a #10 wood saw, are irregular in shape, as well as in size, which is distinctly advantageous in the present invention. Whereas normally the tread surface of the tire made in accordance with our invention feels reasonably smooth and of uniform texture to the touch under ordinary circumstances, the tread surface in contact with the ground or with the ice, due to the weight of the car at the place where the tire is resting or contacting the ground, has a tremendous number of rough wood surfaces projecting or protruding from it, being the ends, corners and edges of irregularly-shaped wood particles exposed at the surface of the tire, these creating a unique surface condition at that instant which is effective to give tremendous traction and holding power. As the wheel moves around, shifting the point of compression, the wood particles tend to draw back into the surface as the tire resumes its normal shape.

The irregular shape of the particles not only increases the effectiveness of the particles to give traction and resist skidding, but it is effective in more securely anchoring the particles in the rubber, and holds them in. In all cases the wood particles are kiln dried before they are introduced into the rubber. Additionally they may be treated with some chemical which will increase the adhesion between the wood and the rubber. For example a solution of pine tar used to treat the wood particles will cause the rubber in being cured to attach itself more firmly to the wood particles. The active ingredient of the pine tar is a terpene which causes the rubber to wet and adhere to the wood.

In the practice of our invention the wood particles are uniformly mixed throughout the rubber to be used in making the tread of the tire by adding the wood particles along with other ingredients in the Banbury mixer which is the mechanism commonly employed for mixing ingredients with rubber in preparing rubber for its final curing. Also the wood particles, instead of being incorporated at the mixing machine, may be calendered into the rubber on the calendering rolls. It makes no difference which operation is employed, although because of the greater bulk of the wood particles it is somewhat more effective and cheaper to mix the wood particles into the rubber in the Banbury or similar mixing machine.

Rubber to which the wood particles have been added may be used in forming the outer layers or treads of new automobile tires, or it may be formed into strips for use in retreading tires as is well understood in the art. Also while the invention has primary application to rubber for use in tires, such rubber also may be very effectively used in rubber shoes, and particularly rubber shoes intended for use on wet surfaces, as for example, on the decks of ships, or for walking on wet ice, or for other purposes where non-slipping qualities are especially needed.

The term "rubber" as used in the present application is used in its generic sense as comprehending both natural rubber of the type used in tires, shoes and shoe treads, as well as synthetic rubber and combinations of synthetic and natural rubber, and the term is not used in the limited sense of meaning natural rubber alone. We of course recognize that the so-called "synthetic" rubbers are actually not rubber, but are a substitute. However they are spoken of in the art as rubber, and our invention includes both the natural and the synthetic materials. Except for the wood particles, the rubber is compounded in all respects the same as for tires or like articles according to well known practices in the art.

Not only are the wood particles highly effective in improving the traction qualities of the tire, but because of the surprisingly large proportion of wood, from the standpoint of volume to rubber, a given quality of rubber is extended substantially so that less rubber need be used in any tread, and an improvement of quality accompanied by a saving of rubber, which of course is more expensive than the wood particles.

While we have described our invention in detail, it will be understood that 25% by weight of wood to 75% by weight of rubber is about the optimum, but the invention is not limited to any exact proportion. However as hereinbefore indicated, any increase of wood particles very much beyond 25% or above about 30% impairs the resilience and the toughness of the rubber and its wearing qualities, whereas very much less than 25%, and say about 20% as a minimum does not give the most desirable tread qualities. Certainly by volume, the wood particles should be at least 50% of the rubber and preferably more. Also while the particle sizes are predominantly smaller than #6 mesh, i. e., capable of passing through a #6 mesh screen, and larger than #16 mesh, still there may be a small percentage of particles which are outside this range. As herein indicated the amazing traction effect and gripping or anti-skid properties are due to the slight projection of many irregular small wood surfaces when a pressure is applied to the rubber.

We claim:

1. A rubber tread surface comprising approximately 20% to 30% by weight of irregularly shaped wood chunks and approximately 80% to 70% by weight, respectively, of a cured rubber matrix, said wood chunks being uniformly and intimately dispersed throughout said rubber matrix, said wood chunks consisting substantially of a screen size between a No. 6 standard mesh screen as a maximum and a No. 16 standard mesh screen as a minimum and being substantially of the configuration of sawdust produced by a No. 10 wood cutting saw, which sawdust is in the form of chunks having projecting ends, corners and edges.

2. A vehicle tire including an anti-skid rubber tread surface comprising approximately 20% to 30% by weight of irregularly shaped hard wood chunks and approximately 80% to 70% by weight, respectively, of cured rubber in the form of a matrix, said wood chunks being uniformly and intimately dispersed throughout said rubber matrix, said wood chunks consisting substantially of a screen size between a No. 6 standard mesh screen as a maximum and a No. 16 standard mesh screen as a minimum and being substantially of the configuration of sawdust produced by a No. 10 wood cutting saw, which sawdust is in the form of chunks having projecting ends, corners and edges.

CLARENCE A. GAPEN.
LONNIE GAPEN.

REFERENCES CITED

The following references are of record in the file of this patent:

UNITED STATES PATENTS

| Number | Name | Date |
|---|---|---|
| 647,112 | Pearson | Apr. 10, 1900 |
| 2,056,558 | Beldam | Oct. 6, 1936 |
| 2,274,855 | Wallace | Mar. 3, 1942 |

FOREIGN PATENTS

| Number | Country | Date |
|---|---|---|
| 472,118 | Great Britain | Sept. 13, 1937 |